US012809777B2

(12) United States Patent
Yang et al.

(10) Patent No.: US 12,809,777 B2
(45) Date of Patent: Nov. 24, 2026

(54) DATA CACHING METHOD AND HOST SYSTEM

(71) Applicant: PHISON ELECTRONICS CORP., Miaoli (TW)

(72) Inventors: Yu-Siang Yang, New Taipei City (TW); Chia Ming Hsu, Taichung City (TW); Jian Ping Syu, Taichung City (TW); Szu-Wei Chen, New Taipei City (TW); Hao-Zhi Lee, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 30 days.

(21) Appl. No.: 19/063,292

(22) Filed: Feb. 26, 2025

(65) Prior Publication Data

US 2026/0244571 A1 Aug. 20, 2026

(30) Foreign Application Priority Data

Feb. 17, 2025 (TW) ................................ 114105676

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 2017/0315908 | A1* | 11/2017 | Yang | G06F 11/108 |
| 2021/0209455 | A1* | 7/2021 | Song | G06F 3/061 |
| 2025/0028563 | A1* | 1/2025 | Lu | G06N 3/084 |
| 2025/0053821 | A1* | 2/2025 | Lim | G06N 3/091 |
| 2026/0050395 | A1* | 2/2026 | Choi | G06F 3/0655 |

FOREIGN PATENT DOCUMENTS

| | | |
|---|---|---|
| CN | 119396420 | 2/2025 |
| TW | 202507565 | 2/2025 |

OTHER PUBLICATIONS

"Office Action of Taiwan Counterpart Application", issued on Aug. 19, 2025, p. 1-p. 9.

* cited by examiner

*Primary Examiner* — Yaima Rigol
(74) *Attorney, Agent, or Firm* — JCIPRNET

(57) ABSTRACT

This disclosure proposes a data caching method and a host system. The host system includes a rewritable non-volatile memory module which includes multiple channels. The data caching method includes: obtaining a current token during an inference phase; reading a previous key matrix and a previous value matrix from the rewritable non-volatile memory module; generating a current key matrix according to the current token and the previous key matrix; generating a current value matrix according to the current token and the previous value matrix; writing multiple portions of the current key matrix into different channels; and writing multiple portions of the current value matrix into different channels.

18 Claims, 11 Drawing Sheets

DATA CACHING METHOD AND HOST SYSTEM

CROSS-REFERENCE TO RELATED APPLICATION

This application claims the priority benefit of Taiwan application serial no. 114105676, filed on Feb. 17, 2025. The entirety of the above-mentioned patent application is hereby incorporated by reference herein and made a part of this specification.

BACKGROUND

Technical Field

The disclosure relates to a data caching method for an artificial intelligence algorithm, a memory storage device, and a memory control circuit unit.

Description of Related Art

The rapid growth of portable electronic devices such as mobile phones and laptops in recent years has led to a rapid increase in consumer demand for storage media. Since a rewritable non-volatile memory module (e.g. a flash memory) has the characteristics of data non-volatility, power saving, small size, and having no mechanical structure, it is very suitable for being built in a variety of portable electronic devices as exemplified above.

In recent years, with the development of artificial intelligence, more and more related applications have emerged. Artificial intelligence involves a lot of computing, accompanied by frequent data writing and reading. When adopting a rewritable non-volatile memory module to complete artificial intelligence related calculations, how to improve the read and write speed is an issue of concern to technical professionals in this field.

SUMMARY

In order to solve the above problems, a data caching method and a host system are provided in the disclosure.

A data caching method for a rewritable non-volatile memory module is provided in the disclosure. The rewritable non-volatile memory module includes multiple channels. Each of the channels includes multiple physical units. The data caching method includes the following operation. A current token is obtained during an inference phase. A previous key matrix and a previous value matrix are read from the rewritable non-volatile memory module. A current key matrix is generated according to the current token and the previous key matrix. A current value matrix is generated according to the current token and the previous value matrix. A portion of the current key matrix is written to the physical units in one of the channels, and another portion of the current key matrix is stored to the physical units in another one of the channels. A portion of the current value matrix is written to the physical units in one of the channels, and another portion of the current value matrix is stored to the physical units in another one of the channels.

In one embodiment of the disclosure, the portion of the current key matrix, the another portion of the current key matrix, the portion of the current value matrix, and the another portion of the current value matrix are written into corresponding physical units in a single level cell programming mode.

In an embodiment of the disclosure, the portion of the current key matrix belongs to a first token, and the another portion of the current key matrix belongs to a second token. The first token is different from the second token.

In an embodiment of the disclosure, the portion of the current key matrix belongs to a first feature, and the another portion of the current key matrix belongs to a second feature. The first feature is different from the second feature.

In one embodiment of the disclosure, the data caching method further includes the following operation. At least one query vector, at least one key vector, and at least one value vector are calculated according to the current token. A temporary vector is obtained by multiplying the query vector and the current key matrix. Attention output is obtained by multiplying the temporary vector and the current value matrix. The operation of generating a current key matrix according to the current token and the previous key matrix includes the following operation. The current key matrix is generated by combining the key vector and the previous key matrix. The operation of generating a current value matrix according to the current token and the previous value matrix includes the following operation. The current value matrix is generated by combining the value vector and the previous value matrix.

In one embodiment of the disclosure, the query vector includes a first query vector and a second query vector, the key vector includes a first key vector and a second key vector, the value vector includes a first value vector and a second value vector, the previous key matrix includes a first previous key matrix and a second previous key matrix, and the previous value matrix includes a first previous value matrix and a second previous value matrix. The operation of generating the current key matrix by combining the key vector and the previous key matrix includes the following operation. A first current key matrix is generated by combining the first key vector and the first previous key matrix, and a second current key matrix is generated by combining the second key vector and the second previous key matrix. The operation of generating the at least one current value matrix by combining the value vector and the previous value matrix includes the following operation. A first current value matrix is generated by combining the first value vector and the first previous value matrix, and a second current value matrix is generated by combining the second value vector and the second previous value matrix. The portion of the current key matrix belongs to the first current key matrix, and the another portion of the current key matrix belongs to the second current key matrix, in which the portion of the current value matrix belongs to the first current value matrix, and the another portion of the current value matrix belongs to the second current value matrix.

In one embodiment of the disclosure, the current token is input to a first layer of the neural network, and a neural network also includes a second layer. The data caching method also includes the following operation. A portion of a current key matrix corresponding to the second layer and a portion of the current key matrix corresponding to the first layer are written into the physical units in the same channel.

In one embodiment of the disclosure, the data caching method further includes the following operation. A next token is obtained. The portion of the current key matrix and the another portion of the current key matrix are read from the channels in parallel. The portion of the current value matrix and the another portion of the current value matrix are read from the channels in parallel.

In one embodiment of the disclosure, the operation of calculating the query vector, the key vector, and the value vector according to the current token includes the following operation. The query vector is obtained by multiplying the current token by a query weight matrix. The key vector is obtained by multiplying the current token by a key weight matrix. The value vector is obtained by multiplying the current token by a value weight matrix.

From another perspective, a host system including a memory storage device and a processor are provided in an embodiment of the disclosure. The memory storage device includes a rewritable non-volatile memory module, which includes multiple channels. Each of the channels includes multiple physical units. The processor is electrically connected to the memory storage device and is configured to perform multiple operations. A current token is obtained during an inference phase. A previous key matrix and a previous value matrix are read from the rewritable non-volatile memory module. A current key matrix is generated according to the current token and the previous key matrix. A current value matrix is generated according to the current token and the previous value matrix. The memory storage device is configured to write a portion of the current key matrix to the physical units in one of the channels, store another portion of the current key matrix to the physical units in another one of the channels. The memory storage device is configured to write a portion of the current value matrix to the physical units in one of the channels, and store another portion of the current value matrix to the physical units in another one of the channels.

In one embodiment of the disclosure, the memory storage device is configured to write the portion of the current key matrix, the another portion of the current key matrix, the portion of the current value matrix, and the another portion of the current value matrix into corresponding physical units in a single level cell programming mode.

In one embodiment of the disclosure, the current token is input to a first layer of a neural network, and the neural network further includes a second layer. The memory storage device is configured to write a portion of the current key matrix corresponding to the second layer and a portion of the current key matrix corresponding to the first layer into the physical units in the same channel.

In one embodiment of the disclosure, the host system is further configured to obtain a next token. The memory storage device reads the portion of the current key matrix and the another portion of the current key matrix from the channel in parallel, and reads the portion of the current value matrix and the another portion of the current value matrix from the channel in parallel.

In order to make the above-mentioned features and advantages of the disclosure comprehensible, embodiments accompanied with drawings are described in detail below.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the system and method within the scope of the patent application of the disclosure.

The terms “first”, “second”, etc. used in this document do not specifically refer to the sequence or order, but are only used to distinguish components or operations described with the same technical terms.

In general, a memory storage device (also referred to as a memory storage system) includes a rewritable non-volatile memory module and a controller (also referred to as a control circuit). The memory storage device may be used with a host system so that the host system may write data to or read data from the memory storage device.

Figure 1:
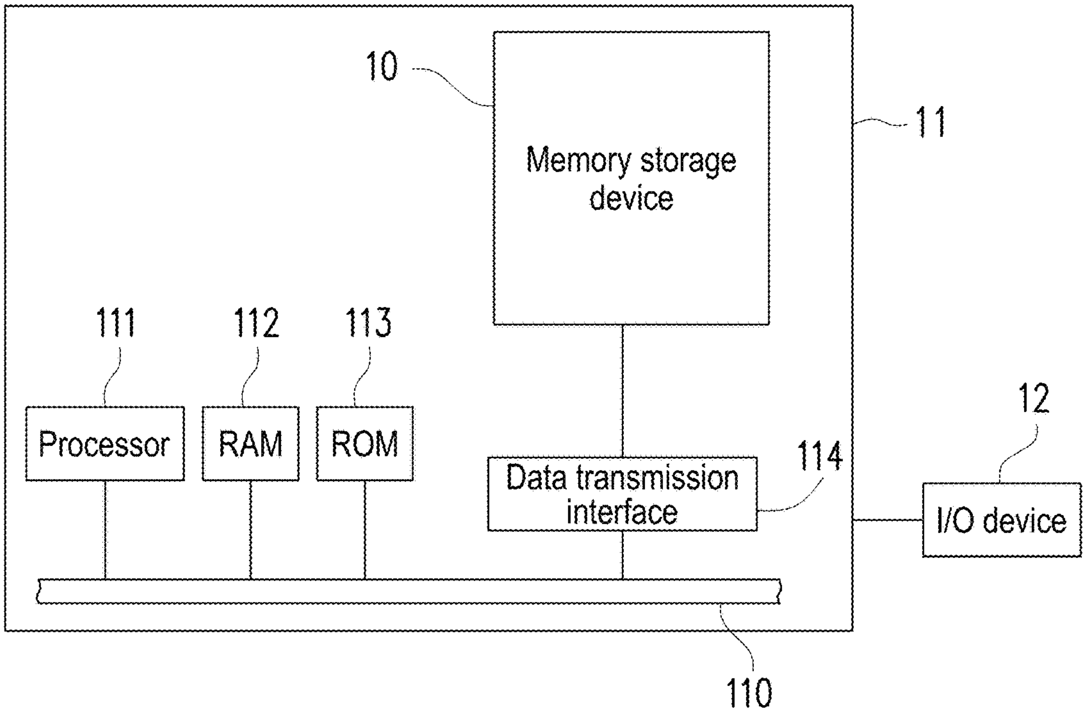
FIG. 1 is a schematic diagram of a host system and an input/output (I/O) device according to an exemplary embodiment of the disclosure.
Figure 2:
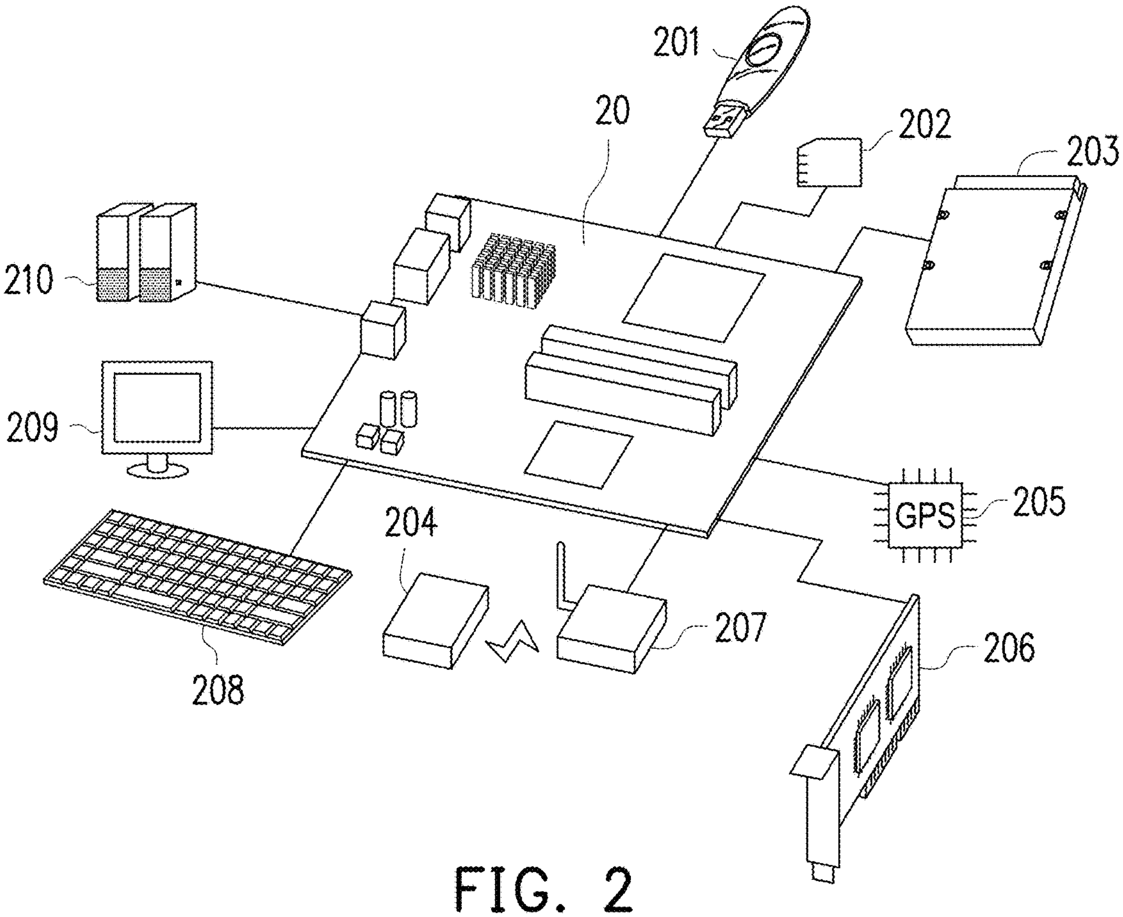
FIG. 2 is a schematic diagram of a host system, a memory storage device, and an I/O device according to an exemplary embodiment of the disclosure.

FIG. 1 is a schematic diagram of a host system and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, the host system 11 is a computer system. This computer system may be a desktop computer, a server, a distributed system, a laptop, etc., but the disclosure is not limited thereto. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110. The processor 111 may be a graphic processing unit (GPU), a tensor processing unit (TPU), a neural processing unit (NPR), a central processing unit, etc. In some embodiments, the processor 111 is also provided with a memory.

In an exemplary embodiment, the processor 111 may be coupled to a memory storage device 10 through the data transfer interface 114. For example, the processor 111 may store data to or read data from the memory storage device 10 via the data transmission interface 114. In addition, the host system 11 may be coupled to an I/O device 12 through the system bus 110. For example, the host system 11 may transmit output signals to or receive input signals from the I/O device 12 via the system bus 110. In other embodiments, the processor 111 may also be electrically connected to the memory storage device 10 through a dedicated data transmission interface 114 instead of through the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. The motherboard 20 may be coupled to the memory storage device 10 through the data transmission interface 114 via a wired or wireless connection.

In an exemplary embodiment, the memory storage device 10 may be, for example, a flash drive 201, a memory card 202, or a solid state drive (SSD) 203. In some embodiments, the memory storage device 10 may be disposed outside the host system 11 as a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g. iBeacon), etc. In addition, the motherboard 20 may also be coupled to various I/O devices, such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

Figure 3:
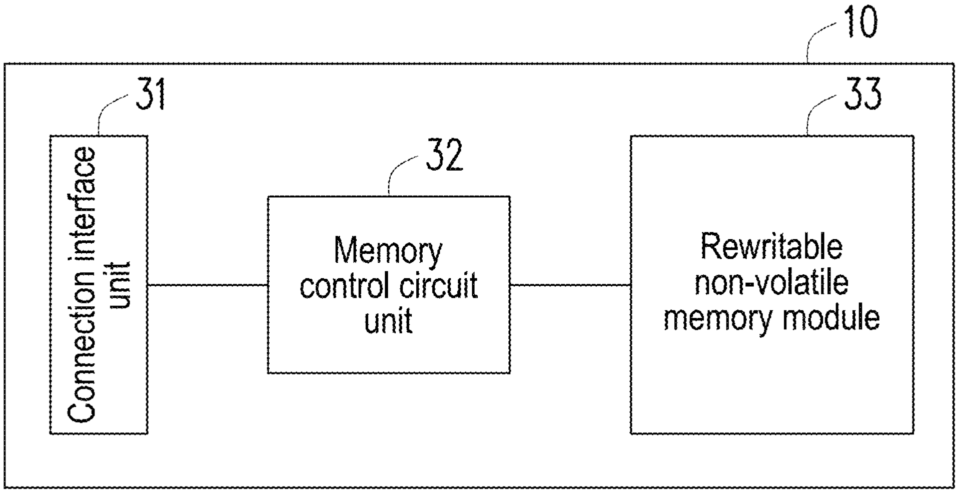
FIG. 3 is a schematic diagram of a memory storage device according to an exemplary embodiment of the disclosure.

FIG. 3 is a schematic diagram of a memory storage device according to an exemplary embodiment of the disclosure. Referring to FIG. 3, the memory storage device 10 includes a connection interface unit 31, a memory control circuit unit 32, and a rewritable non-volatile memory module 33.

The connection interface unit 31 is configured to couple to a processor 111. The memory storage device 10 may communicate with the processor 111 via the connection interface unit 31. In an exemplary embodiment, the connection interface unit 31 is compatible with the peripheral component interconnect express (PCI Express) standard. In an exemplary embodiment, the connection interface unit 31 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 31 may be packaged in a chip with the memory control circuit unit 32, or the connection interface unit 31 may be disposed outside a chip including the memory control circuit unit 32.

The memory control circuit unit 32 is coupled to the connection interface unit 31 and the rewritable non-volatile memory module 33. The memory control circuit unit 32 is used to execute multiple logic gates or control commands implemented in a hardware form or a firmware form and to perform operations such as writing, reading, and erasing of data in the rewritable non-volatile memory module 33 according to the commands of the processor 111.

The rewritable non-volatile memory module 33 is used to store the data written by the processor 111. The rewritable non-volatile memory module 33 may include a single level cell (SLC) NAND-type flash memory module (i.e., a flash memory that may store 1 bit in one memory cell), multi-level cell (MLC) NAND-type flash memory module (i.e., a flash memory module that may store 2 bits in one memory cell), a triple level cell (TLC) NAND-type flash memory module (i.e., a flash memory module that may store 3 bits in one memory cell), a quad level cell (QLC) NAND-type flash memory module (i.e., a flash memory module that may store 4 bits in one memory cell), other flash memory modules, or other memory modules with the same characteristics.

Each memory cell in the rewritable non-volatile memory module 33 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 33 has multiple storage statuses. By applying a read voltage, it is possible to determine which storage status a memory cell belongs to, thereby obtaining the one or more bits stored in the memory cell.

In an exemplary embodiment, the memory cells of the rewritable non-volatile memory module 33 may constitute multiple physical programming units, and the physical programming units may constitute multiple physical erasing units. Specifically, memory cells on the same word line may form one or more physical programming units. If each memory cell may store two or more bits, the physical programming units on the same word line may be classified at least as lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In some embodiments, the processor 111 or the memory control circuit unit 32 may determine a programming mode for writing data into the rewritable non-volatile memory module 33. When using the single level cell programming mode, data is written to the next physical programming unit. When using a multi-level (including two-level, three-level, four-level, etc.) cell programming mode, data is written into at least the lower physical programming unit and the upper physical programming unit.

Figure 4:
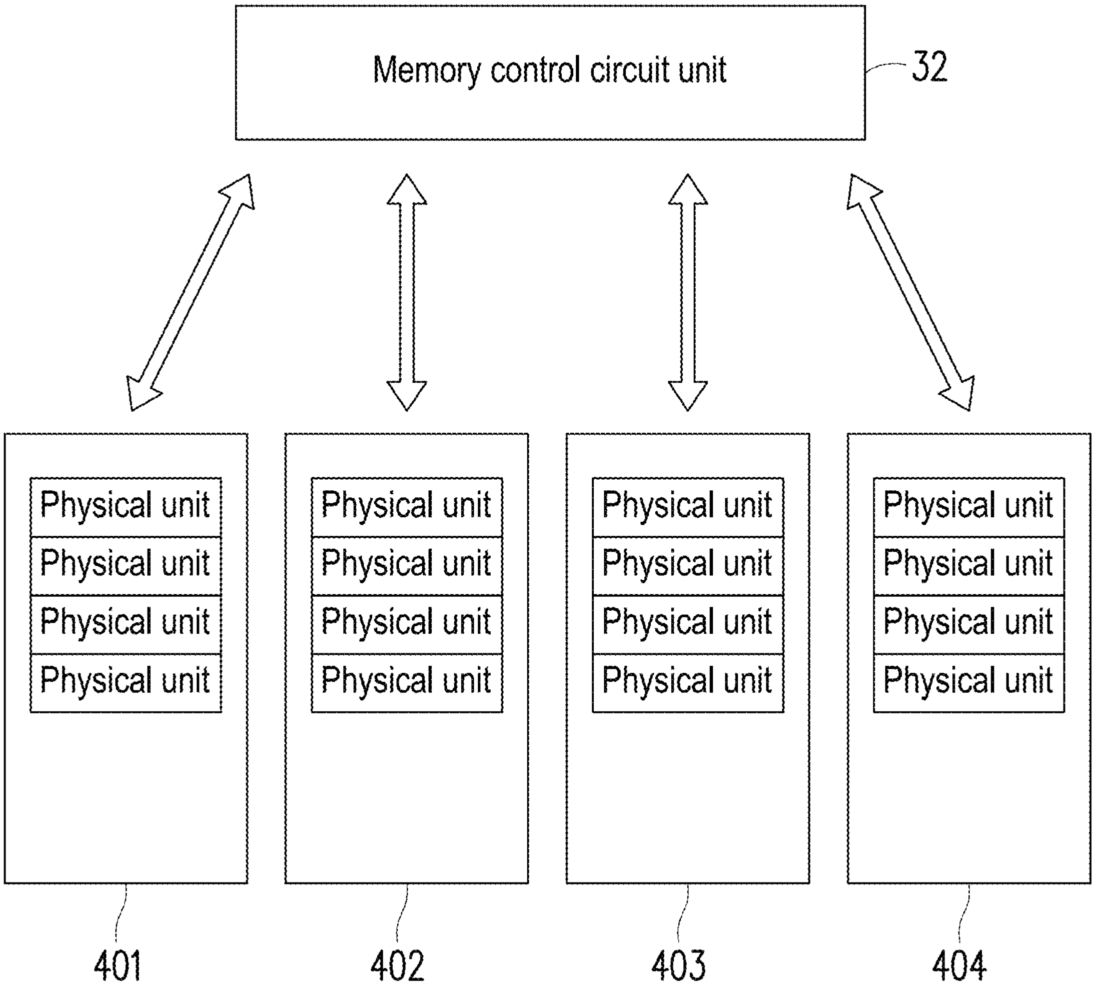
FIG. 4 is a schematic diagram of multiple channels according to an embodiment.

FIG. 4 is a schematic diagram of multiple channels according to an embodiment.

Referring to FIG. 4, the rewritable non-volatile memory module 33 includes multiple channels 401 to 404, and each channel has multiple physical units. In an exemplary embodiment, a physical unit refers to a physical address or a physical programming unit. In an exemplary embodiment, a physical unit may also be formed by multiple consecutive or non-consecutive physical addresses. In an exemplary embodiment, a physical unit may also refer to a virtual block (VB). A virtual block may include multiple physical addresses or multiple physical programming units. In an exemplary embodiment, a virtual block includes one or more physical erasing units. Each channel 401 to 404 operates independently. For example, each channel belongs to an independent chip and is controlled by a specific chip enable (CE) signal. The memory control circuit unit 32 may write data into the channels 401 to 404 in parallel, or read data from the channels 401 to 404 in parallel.

In this embodiment, the processor 111 executes an inference phase of a neural network.

Some data are generated during the inference phase and cached in the rewritable non-volatile memory module 33. In particular, according to the operation, architecture, and data characteristics of the neural network, different data may be written into different channels 401 to 404 in parallel, thereby increasing the reading and write speed. Regarding the writing and reading of data, the processor 111 sends a write command or a read command to the memory control circuit unit 32, and the memory control circuit unit 32 reads data from the rewritable non-volatile memory module 33 or writes data to the rewritable non-volatile memory module 33.

Figure 5:
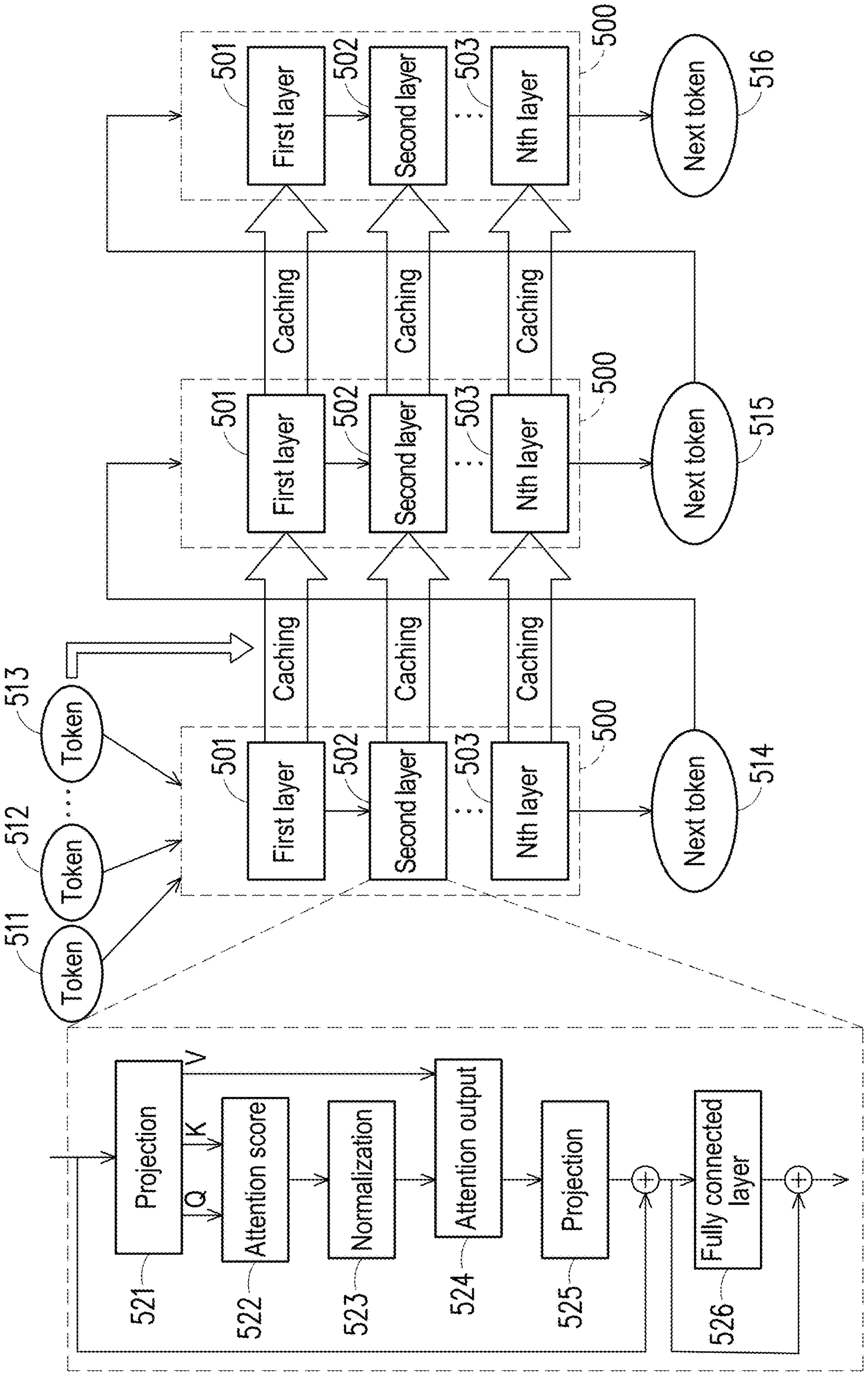
FIG. 5 is a schematic diagram of a neural network during an inference phase according to an embodiment.

FIG. 5 is a schematic diagram of a neural network during an inference phase according to an embodiment. Referring to FIG. 5, a neural network 500 includes a first layer 501, a second layer 502, . . . , up to an $N^{th}$ layer 503, where N is a positive integer. The input of the neural network 500 is multiple tokens 511 to 513. Each token may be text data, voice data, image data, or other types of data, but the disclosure is not limited thereto. Each token is a vector generated by encoding or other processing. Here, it represents the operational unfolding of neural network 500 at various time points. Specifically, the neural network 500 outputs the next token 514, and the next token 514 is fed back as the input of the neural network 500 to generate the next token 515. Likewise, the next token 515 is fed back as the input of the neural network 500 to generate the next token 516. Such a mechanism is also referred to as autoregressive (AT).

Each of the first layer 501 to the $N^{th}$ layer 503 is also referred to as a decoder, and the architectures of these decoders are the same. The output of the first layer 501 may also be referred to as a token, an embedding, or a feature vector. The output of the first layer 501 is transmitted to the second layer 502, and the output of the second layer 502 is transmitted to the next layer until it is transmitted to the $N^{th}$ layer 503. In FIG. 5, the architecture of the second layer 502 is magnified as an example.

The operation of the second layer 502 includes steps 521 to 526. Generally speaking, projection is performed in step 521 to obtain the query matrix Q, the key matrix K, and the value matrix V. In step 522, an attention score is calculated according to the query matrix Q and the key matrix K. In step 523, normalization is performed on these attention scores. This normalization is used to change the value range, for example, a soft-max method may be used, and in other embodiments, a sparsemax method may also be used. Then in step 524, the normalized attention scores are multiplied with the value matrix V and summed to calculate an attention output. In step 525, the attention output may be projected again and added with the current token, which is also referred to as a residual layer. Finally, in step 526, the output of this layer is obtained through a fully connected layer. Steps 522 to 524 are also referred to as self-attention calculations.

Figure 6:
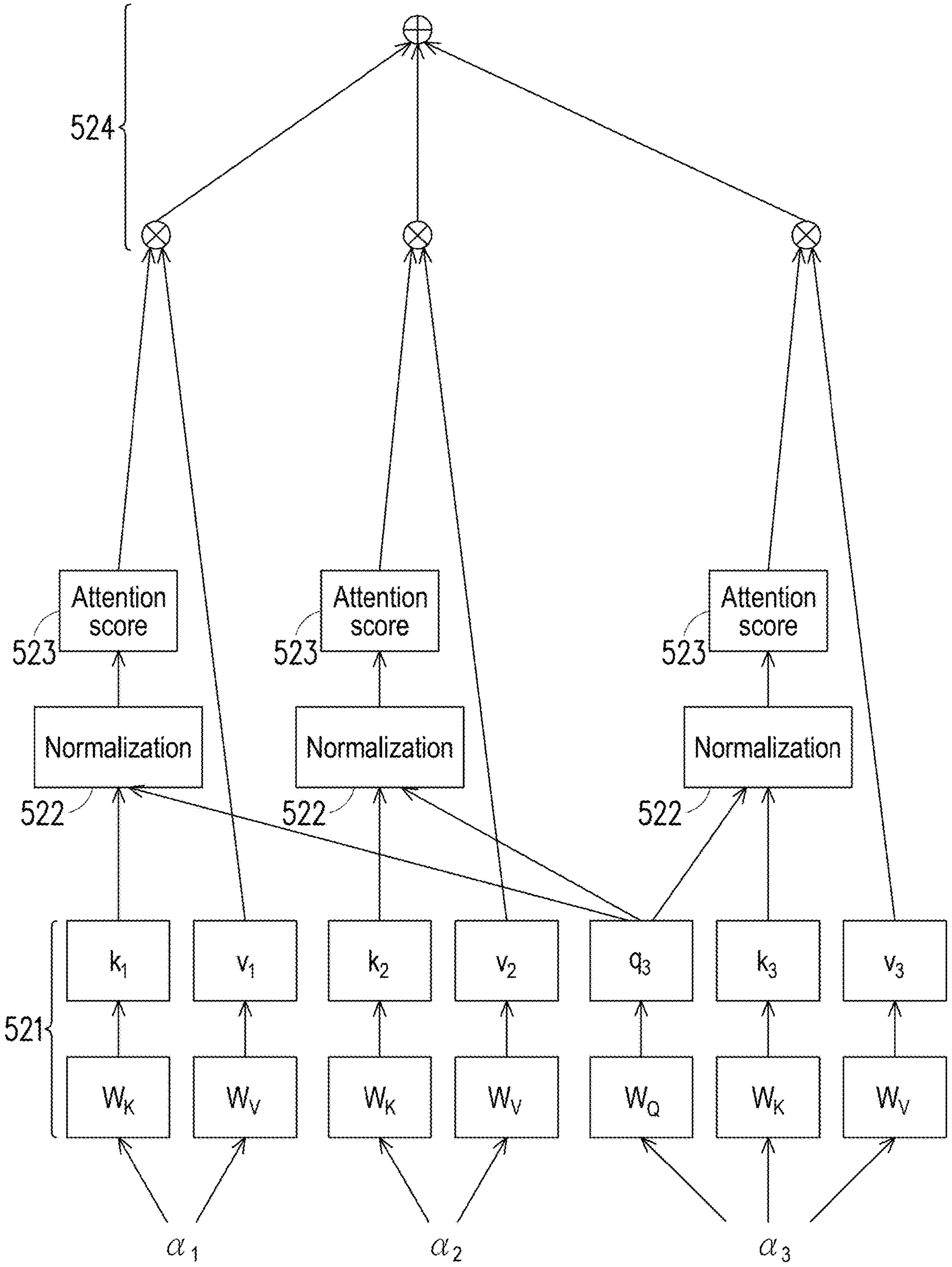
FIG. 6 is a schematic diagram of calculations of self-attention according to an embodiment.

FIG. 6 is a schematic diagram of calculations of self-attention according to an embodiment. Referring to FIG. 5 and FIG. 6, it is assumed that there are three tokens $\alpha_1$, $\alpha_2$, and $\alpha_3$, where the token $\alpha_3$ is also referred to as the current token.

The multiplication of token $\alpha_1$ by a key weight matrix $W_K$ yields the key vector $k_1$, while the multiplication of token $\alpha_1$ by a value weight matrix $W_V$ yields the value vector $v_1$. Similarly, the multiplication of token $\alpha_2$ by a key weight matrix $W_K$ yields the key vector $k_2$, while the multiplication of token $\alpha_2$ by a value weight matrix $W_V$ yields the value vector $v_2$. The multiplication of token $\alpha_3$ by a key weight matrix $W_K$ yields the key vector $k_3$, while the multiplication of token $\alpha_3$ by a value weight matrix $W_V$ yields the value vector $v_3$. In addition, the multiplication of the token $\alpha_3$ by a query weight matrix $W_Q$ yields the query vector $q_3$.

Next, the calculation of the dot product of the query vector $q_3$ and the key vector $k_1$ yields an attention score, herein denoted as $\beta_1$. Similarly, the calculation of the dot product of the query vector $q_3$ and the key vector $k_2$ yields the attention score $\beta_2$, while the calculation of the dot product of the query vector $q_3$ and the key vector $k_3$ yields the attention score $\beta_3$. Next, the attention scores $\beta_1$, $\beta_2$, and $\beta_3$ are normalized. The normalization is, for example, softmax, but the disclosure is not limited thereto.

Then, the normalized attention score $\beta_1$ is multiplied by the value vector $v_1$, the normalized attention score $\beta_2$ is multiplied by the value vector $v_2$, and the normalized attention score $\beta_3$ is multiplied by the value vector $v_3$. Finally, these products are summed up to obtain an attention output, which is expressed as the following Mathematical formula 1, where $o_3$ is a vector referred to as the attention output.

$$o_3 = \sum_i \beta_i \times v_i \qquad \text{[Mathematical formula 1]}$$

Figure 7:
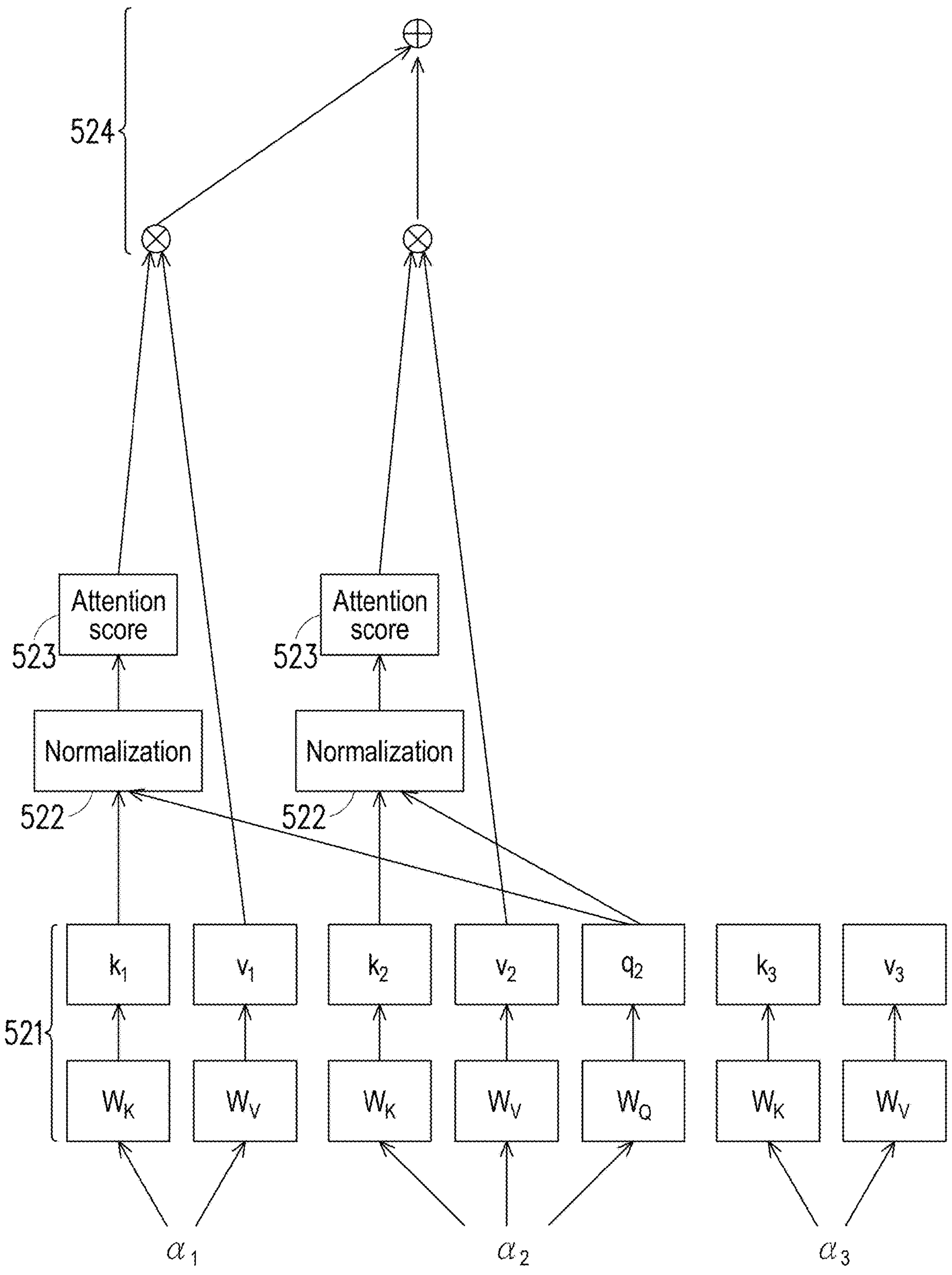
FIG. 7 is a schematic diagram of calculations of self-attention according to an embodiment.

The attention output $o_3$ calculated above corresponds to the current token $\alpha_3$. For the tokens $\alpha_1$ and $\alpha_2$, the corresponding attention outputs $o_1$ and $o_2$ may also be calculated. As shown in FIG. 7, taking the token $\alpha_2$ as an example, the token $\alpha_2$ is multiplied by the query weight matrix $W_Q$ to obtain the query vector $q_2$, and the rest of the operations are the same as those in FIG. 6. In particular, the query vector $q_2$ is not multiplied by the key vector $k_3$. This is because token $\alpha_2$ occurs before token $\alpha_3$, and there is no information about token $\alpha_3$ when calculating the attention output about token $\alpha_2$. In other words, the query vector of each token is simply multiplied by the key vector of the token that has previously occurred.

Figure 8:
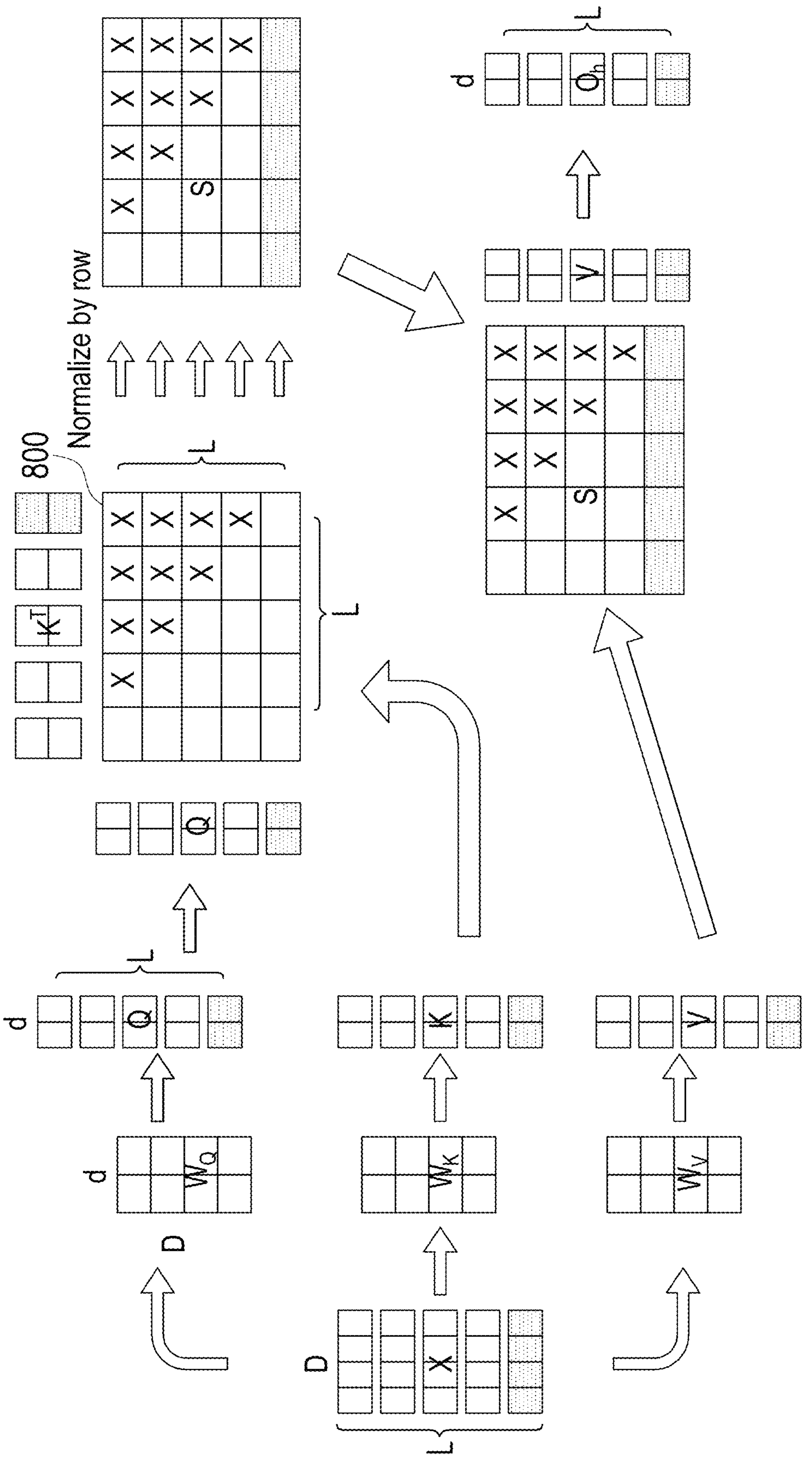
FIG. 8 is a schematic diagram of a matrix operation related to attention according to an embodiment.

For each token $\alpha_1$, $\alpha_2$, and $\alpha_3$, the corresponding attention output is calculated. In this regard, the tokens $\alpha_1$, $\alpha_2$, and $\alpha_3$ may be arranged to form a matrix X, and the above calculation may be expressed in the form of matrices. FIG. 8 is a schematic diagram of a matrix operation related to attention according to an embodiment. Referring to FIG. 6 and FIG. 8, each column of the matrix X represents a token. In this example, there are L tokens in total. The length of each token (as a vector) is D, where L and D are positive integers. On the other hand, dimensions of the query weight matrix $W_Q$, key weight matrix $W_K$, and value weight matrix Wy are all D×d, where d is a positive integer.

Each token $\alpha_1$, $\alpha_2$, and $\alpha_3$ is multiplied by the query weight matrix $W_Q$. After being expressed as a matrix, these calculations are equivalent to multiplying the matrix X and the query weight matrix $W_Q$ to obtain a query matrix Q. Similarly, each token $\alpha_1$, $\alpha_2$, and $\alpha_3$ is multiplied by the key weight matrix $W_K$. After being expressed as a matrix, these calculations are equivalent to multiplying the matrix X and the query weight matrix $W_K$ to obtain a key matrix K. Each token $\alpha_1$, $\alpha_2$, and $\alpha_3$ is multiplied by the value weight matrix $W_V$. After being expressed as a matrix, these calculations are equivalent to multiplying the matrix X and the query weight matrix $W_V$ to obtain a value matrix V. The dimensions of the query matrix Q, the key matrix K, and the value matrix V are all D×L, where each row corresponds to a token and each column corresponds to a feature. From another perspective, the query matrix Q includes L query vectors, such as the query vectors $q_1$, $q_2$, and $q_3$ mentioned above. Similarly, the key matrix K includes L key vectors, such as the key vectors $k_1$, $k_2$, and $k_3$ mentioned above. The value matrix V includes L value vectors, such as the value vectors $v_1$, $v_2$, and $v_3$ mentioned above.

The multiplication of the query vectors $q_1$, $q_2$, and $q_3$ and the key vectors $k_1$, $k_2$, and $k_3$ is equivalent to the transpose multiplication of the query matrix Q and the key matrix K after being expressed as matrices, such as the matrix 800 in FIG. 8, which has a dimension of L×L, where each element is an attention score. However, there are a number of "x" elements in the matrix 800, which indicates that the element does not need to be calculated because the query vector of each token is only multiplied by the key vector of the token that has previously occurred. Next, normalization is performed by rows, that is, the elements in the same row of the matrix 800 are normalized (e.g., soft-max), thereby obtaining the matrix S.

Next, the attention score is multiplied by the value vectors $v_1$, $v_2$, and $v_3$ and then the sum is calculated. After being expressed as a matrix, such a calculation is equivalent to multiplying the matrix S and the query matrix V to obtain the output matrix $O_h$, which has a dimension of L×d. In other words, the output matrix $O_h$ includes L attention outputs, for example, the attention outputs $o_1$, $o_2$, and $o_3$ mentioned above, which correspond to the tokens $\alpha_1$, $\alpha_2$, and $\alpha_3$, respectively.

When multiple tokens are input into a neural network, some of the calculations are repeated. For example, when processing the token $\alpha_1$, the key vector $k_1$ and the value vector $v_1$ must be calculated, and when processing the token $\alpha_2$, the key vector $k_1$ and the value vector $v_1$ must also be calculated. Therefore, after processing the token $\alpha_1$, the key vector $k_1$ and the value vector $v_1$ may be written into the rewritable non-volatile memory module 33. When processing the token $\alpha_2$, the key vector $k_1$ and the value vector $v_1$ may be read from the rewritable non-volatile memory module 33. This practice is referred to as KV caching.

Figure 9:
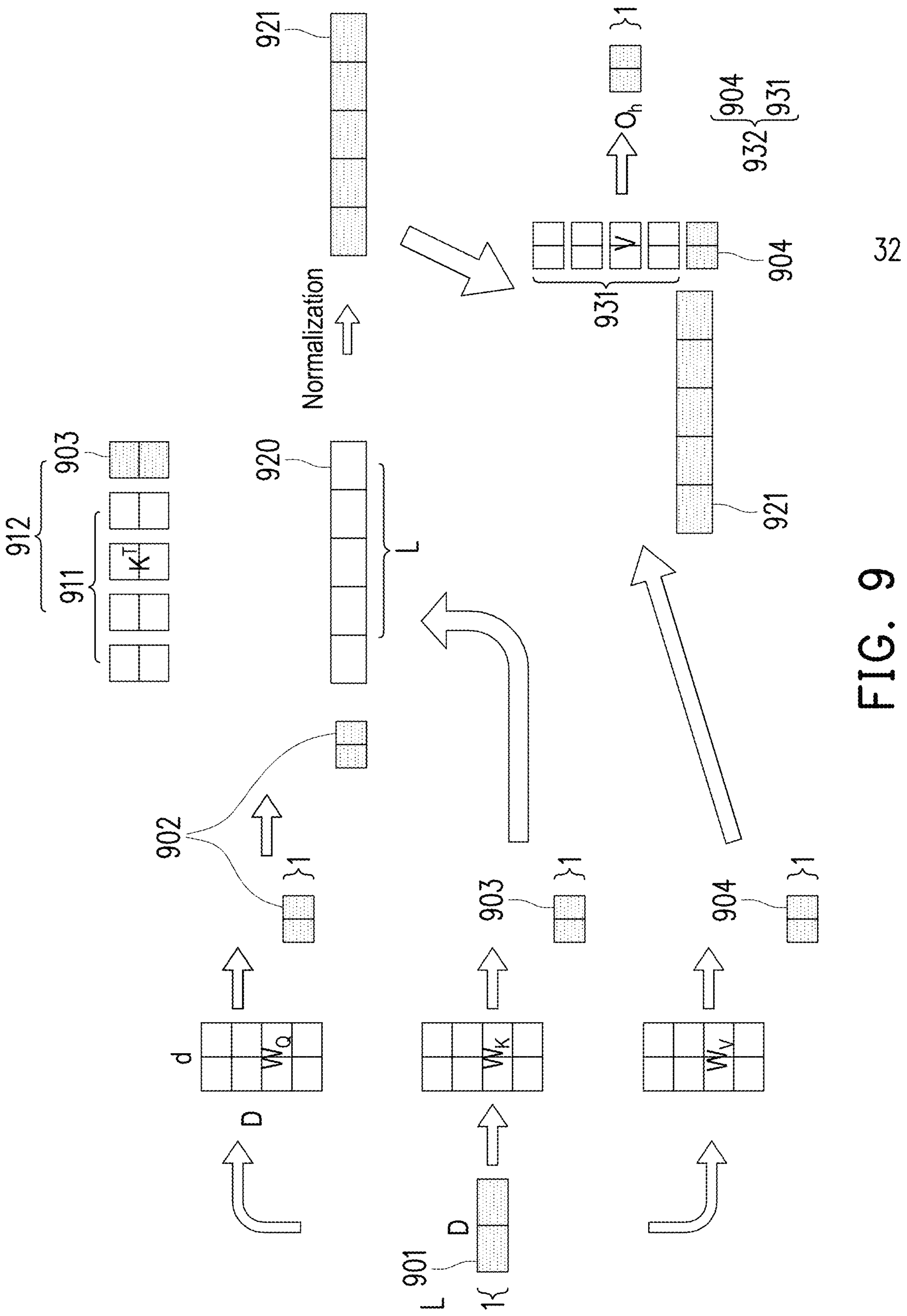
FIG. 9 is a schematic diagram of the operation of applying KV caching according to an embodiment.

FIG. 9 is a schematic diagram of the operation of applying KV caching according to an embodiment. Referring to FIG. 9, firstly, a current token 901 is obtained. The current token 901 is the last row of the matrix X in FIG. 8. Next, the current token is multiplied by the query weight matrix $W_Q$ to obtain the query vector 902. Then, the current token 901 is multiplied by the key weight matrix $W_K$ to obtain a key vector 903. The key vector 903 is the last row of the key matrix K in FIG. 8. Similarly, the current token 901 is multiplied by the value weight matrix Wy to obtain a value vector 904. The value vector 904 is the last row of the value matrix V in FIG. 8.

Then, the previous key matrix 911 is read from the rewritable non-volatile memory module 33. The key vector 903 is combined with the previous key matrix 911 to generate the current key matrix 912. Specifically, the key vector 903 may be transposed and then attached to the last column of the previous key matrix 911 to generate the current key matrix 912. The current key matrix 912 is the same as the transpose of the key matrix K in FIG. 8. Next, the query vector 902 is multiplied by the current key matrix 912 to obtain a temporary vector 920. Each element of the temporary vector 920 is an attention score. A temporary vector 921 may be obtained by normalizing (e.g., soft-max) all elements of the temporary vector 920.

On the other hand, the previous value matrix 931 is read from the rewritable non-volatile memory module 33. The combination of the value vector 904 with the previous value matrix 931 generates the current value matrix 932. Specifically, the value vector 904 is attached to the last row of the previous value matrix 931 to generate the current value matrix 932. This current value matrix 932 is the same as the value matrix V in FIG. 8. Then, the temporary vector 921 is multiplied by the current value matrix 932 to obtain the attention output $O_h$.

After processing the current token, the current key matrix 912 and the current value matrix 932 are written into the rewritable non-volatile memory module 33. When processing the next token, the current key matrix 912 and the current value matrix 932 are read from the rewritable non-volatile memory module 33. It may be seen from this that the rewritable non-volatile memory module 33 is frequently written and read. In order to improve the performance of KV caching, multiple channels in the rewritable non-volatile memory module 33 may be used for parallel processing. Specifically, a portion of the current key matrix 912 may be written to physical units in one of the channels, and another portion of the current key matrix 912 may be written to physical units in another channel. In this way, multiple portions of the current key matrix 912 may be written to multiple channels in parallel, thereby increasing the write speed. Similarly, a portion of the current value matrix 932 may be written to one channel, and another portion of the current value matrix 932 may be written to another channel, which may also increase the write speed. In addition, when processing the next token, multiple portions of the current key matrix 912 may be read from multiple channels in parallel, and multiple portions of the current value matrix 932 may be read from multiple channels in parallel, which may increase the read speed.

The current key matrix 912 has two dimensions, namely, namely a token dimension (corresponding to L tokens) and a feature dimension (corresponding to d features). In some embodiments, the portion of the current key matrix 912 belonging to a first token may be written to one channel, and the portion belonging to another second token may be written to another channel, in which the first token is different from the second token. In some embodiments, different features may be written to different channels. For example, a portion of the current key matrix 912 belonging to a first feature may be written to one channel, and a portion belonging to another second feature may be written to another channel, in which the first feature is different from the second feature. Similarly, the current value matrix 932 also has two dimensions, namely a token dimension and a feature dimension. In some embodiments, the portion of the current value matrix 932 belonging to a first token may be written to one channel, and the portion belonging to another second token may be written to another channel. In some embodiments, the portion of the current value matrix 932 belonging to a first feature may be written to one channel, and the portion belonging to another second feature may be written to another channel.

In some embodiments, multiple portions of the current key matrix 912 and multiple portions of the current value matrix 932 are written into physical units in the rewritable non-volatile memory module 33 in a single level cell programming mode. In other words, each memory cell in the physical unit being written only stores one bit. Since the single level cell programming mode has faster write and read speeds and may be erased more times (compared to the multi-level cell programming mode), the single level cell programming mode is more suitable for the frequent writing/reading of the KV caching mentioned above.

Figure 10:
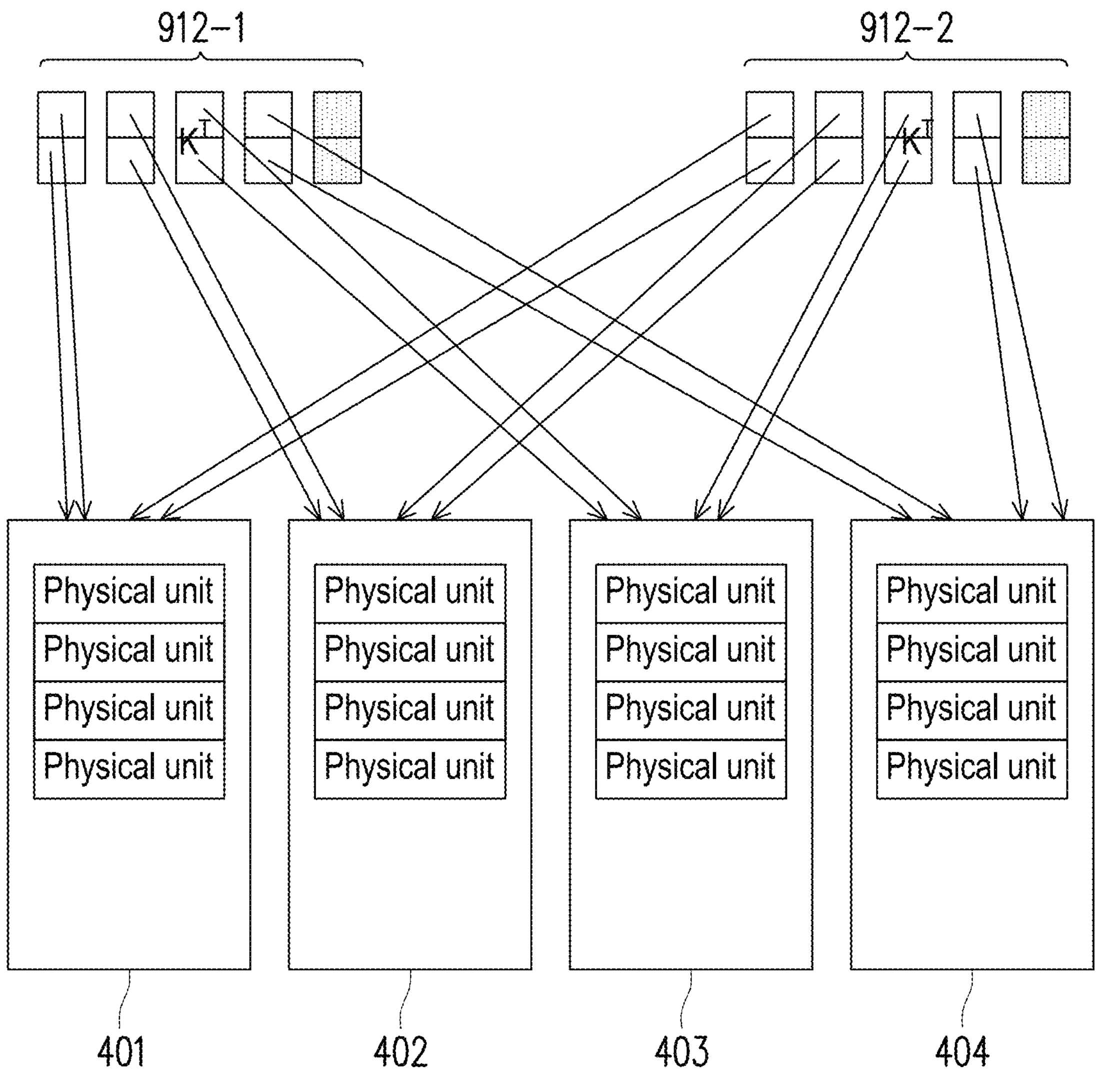
FIG. 10 is a schematic diagram showing caching of multiple layers according to an embodiment.

Referring to FIG. 5, the above operation is about the KV caching of a certain layer in the neural network 500. When processing another layer in the neural network 500, since different layers must be processed sequentially (not in parallel), data from different layers may be written into the same channel. FIG. 10 is a schematic diagram showing caching of multiple layers according to an embodiment. Referring to FIG. 10, here, the current key matrix 912-1 and the current key matrix 912-2 are taken as an example, in which the current key matrix 912-1 belongs to the first layer, and the current key matrix 912-2 belongs to the second layer. Here, multiple portions corresponding to different tokens in the current key matrix are written to different channels. For example, the portion of the current key matrix 912-1 belonging to a first token is written to a channel 401, the portion of the current key matrix 912-1 belonging to a second token is written to a channel 402, the portion of the current key matrix 912-1 belonging to a third token is written to a channel 403, and the portion of the current key matrix 912-1 belonging to a fourth token is written to a channel 404. On the other hand, the portion of the current key matrix 912-2 belonging to a first token is written to a channel 401, the portion of the current key matrix 912-2 belonging to a second token is written to a channel 402, the portion of the current key matrix 912-2 belonging to a third token is written to a channel 403, and the portion of the current key matrix 912-2 belonging to a fourth token is written to a channel 404. When the number of channels is greater than or equal to the number of tokens, the portion of the current key matrix 912-2 belonging to a fifth token may be written to a fifth channel. When the number of channels is less than the number of tokens, the portion of the current key matrix 912-2 belonging to the fifth token may be written to the first channel. The current key matrix in FIG. 9 may be replaced by the current value matrix, and the rest of the operations are the same and are not repeated herein.

The above calculation of attention belongs to single head, but in other embodiments, KV caching may also be applied to multi-head. When multi-head is adopted, each token may be configured to generate multiple query vectors, multiple key vectors, and multiple value vectors, which are divided into multiple heads. The query vector, key vector and value vector belonging to the same head are calculated according to the method shown in FIG. 6 and FIG. 7.

Figure 11:
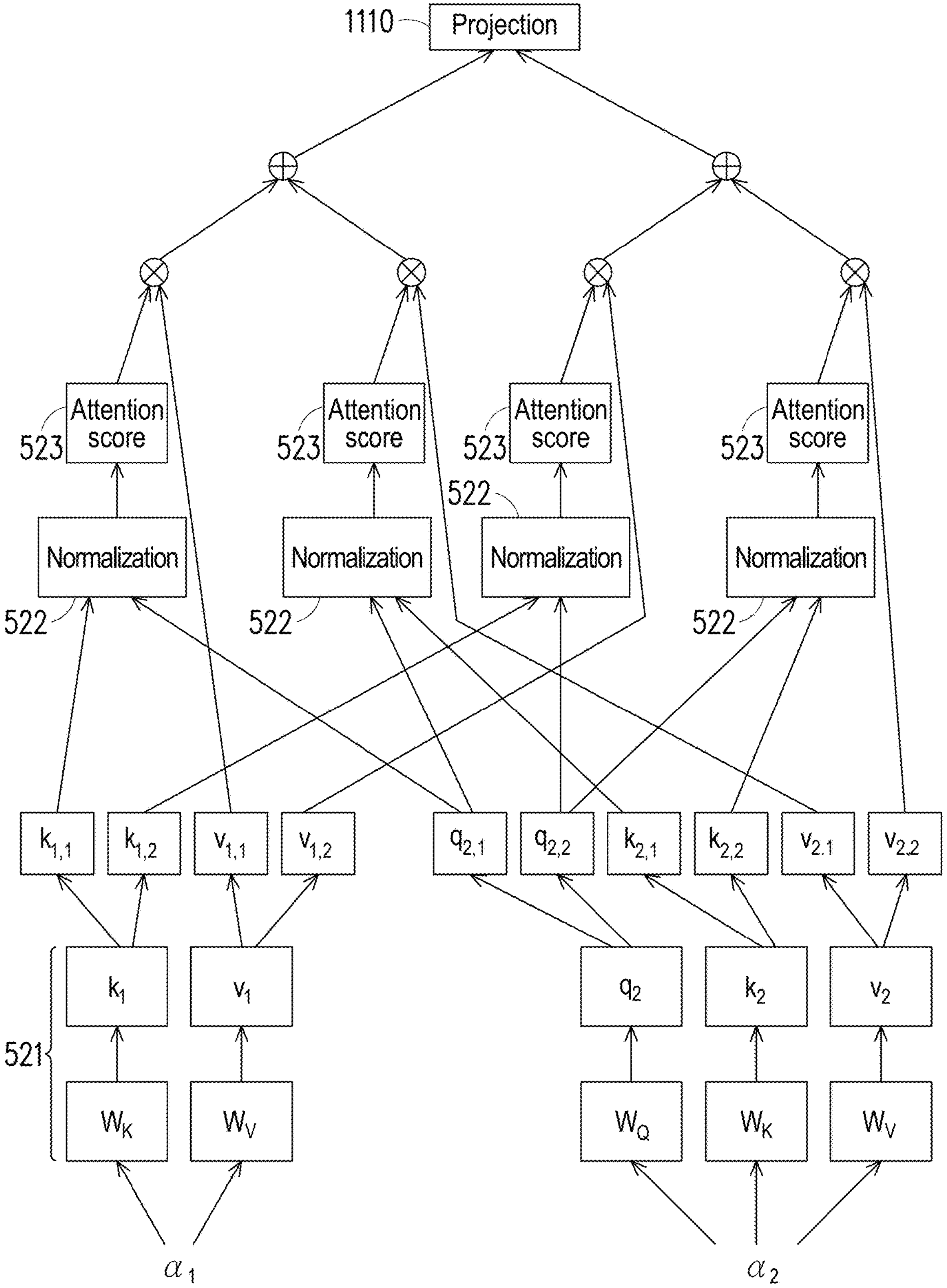
FIG. 11 is a schematic diagram of multi-head calculation according to an embodiment.

FIG. 11 is a schematic diagram of multi-head calculation according to an embodiment. Referring to FIG. 11, for the sake of simplicity, two heads are taken as an example for explanation. After projection, the token $\alpha_1$ may generate a key vector $k_1$ and a value vector $v_1$. The key vector $k_1$ may be further projected (multiplied by two weight matrices respectively) to obtain the key vector $k_{1,1}$ and the key vector $k_{1,2}$. Similarly, the value vector $v_1$ may be further projected to obtain the value vector $v_{1,1}$ and the value vector $v_{1,2}$. The key vector $k_{1,1}$ and the value vector $v_{1,1}$ belong to the first head, while the key vector $k_{1,2}$ and the value vector $v_{1,2}$ belong to the second head.

For the token $\alpha_2$, after generating the query vector $q_2$, the key vector $k_2$, and the value vector $v_2$, the query vector $q_2$ may be further projected to generate the query vectors $q_{2,1}$ and $q_{2,2}$, the key vector $k_2$ may be further projected to generate the key vector $k_{2,1}$ and the key vector $k_{2,2}$, and the value vector $v_2$ may be further projected to generate the value vector $v_{2,1}$ and the value vector $v_{2,2}$. The query vector $q_{2,1}$, the key vector $k_{2,1}$, and the value vector $v_{2,1}$ belong to the first head, and the query vector $q_{2,2}$, the key vector $k_{2,2}$, and the value vector $v_{2,2}$ belong to the second head.

The query vector $q_{2,1}$ is multiplied by the key vector $k_{1,1}$ to obtain the attention score, which is then multiplied by the value vector $v_{1,1}$. The query vector $q_{2,1}$ is also multiplied by the key vector $k_{2,1}$ to obtain the attention score, which is then multiplied by the value vector $v_{2,1}$. These two products are added to obtain a vector as the first input of the projection in step 1110.

The query vector $q_{2,2}$ is multiplied by the key vector $k_{1,2}$ to obtain the attention score, which is then multiplied by the value vector $v_{1,2}$. The query vector $q_{2,2}$ is also multiplied by the key vector $k_{2,2}$ to obtain the attention score, which is then multiplied by the value vector $v_{2,2}$. These two products are added to obtain a vector as the second input of the projection in step 1110.

In step 1110, the two input vectors are concatenated and multiplied by a matrix to obtain the attention output.

For each head, KV caching is done the same as for a single head. Specifically, the key vector $k_{1,1}$ and the key vector $k_{2,1}$ form a first key matrix and are stored in the rewritable non-volatile memory module 33. When processing the next token, the first key matrix is referred to as the first previous key matrix. On the other hand, the key vector $k_{1,2}$ and the key vector $k_{2,2}$ form a second key matrix and are stored in the rewritable non-volatile memory module 33. When processing the next token, the second key matrix is referred to as the second previous key matrix. In some embodiments, key matrices belonging to different heads may be written to different channels in parallel, and thus previous key matrices may be read from different channels in parallel. For subsequent calculations, reference may be made to FIG. 9. For the next token, the first previous key matrix is combined with the first key vector belonging to the first head to generate a first current key matrix. Furthermore, the second previous key matrix and the second key vector belonging to the second head may be combined to generate a second current key matrix. After processing the next token, the first current key matrix and the second current key matrix may be written to different channels.

Similarly, the value vector $v_{1,1}$ and the value vector $v_{2,1}$ form a first value matrix and are stored in the rewritable non-volatile memory module 33. When processing the next token, the first value matrix is referred to as the first previous value matrix. On the other hand, the value vector $v_{1,2}$ and the value vector $v_{2,2}$ form a second value matrix and are stored in the rewritable non-volatile memory module 33. When processing the next token, the second value matrix is referred to as the second previous value matrix. In some embodiments, value matrices belonging to different heads may be written to different channels in parallel, and thus previous value matrices may be read from different channels in parallel. For subsequent calculations, reference may be made to FIG. 9. For the next token, the first previous value matrix is combined with the first value vector belonging to the first head to generate a first current value matrix. Furthermore, the second previous value matrix and the second value vector belonging to the second head may be combined to generate a second current value matrix. After processing the next token, the first current value matrix and the second current value matrix may be written to different channels.

In summary of the above embodiments, after generating at least one current key matrix, a portion of the current key matrix may be written into one channel, and another portion may be written into another channel. These portions may be different heads, tokens or features. Likewise, after generating at least one current value matrix, a portion of the current value matrix may be written into one channel, and another portion may be written into another channel. These portions may be different heads, tokens or features. When processing different layers of a neural network, the tokens, features, or heads in different layers may be written into the same channel.

In some embodiments, the processor 111 may transmit the arrangement information of the current key matrix and the current value matrix to the memory control circuit unit 32. This arrangement information may be configured to calculate to which head, token, and feature the data in each logic address belongs. For example, the arrangement information is configured to indicate that the first head is transmitted first and then the second head is transmitted, and in the same head, the first token is transmitted first and then the second token is transmitted. In this way, the memory control circuit unit 32 first receives the data belonging to the first head, the first token, and the first feature, and then receives the data belonging to the first head, the first token, and the second feature, and so on. The memory control circuit unit 32 may write different portions of the current key matrix and the current value matrix into different channels according to the arrangement information.

Figure 12:
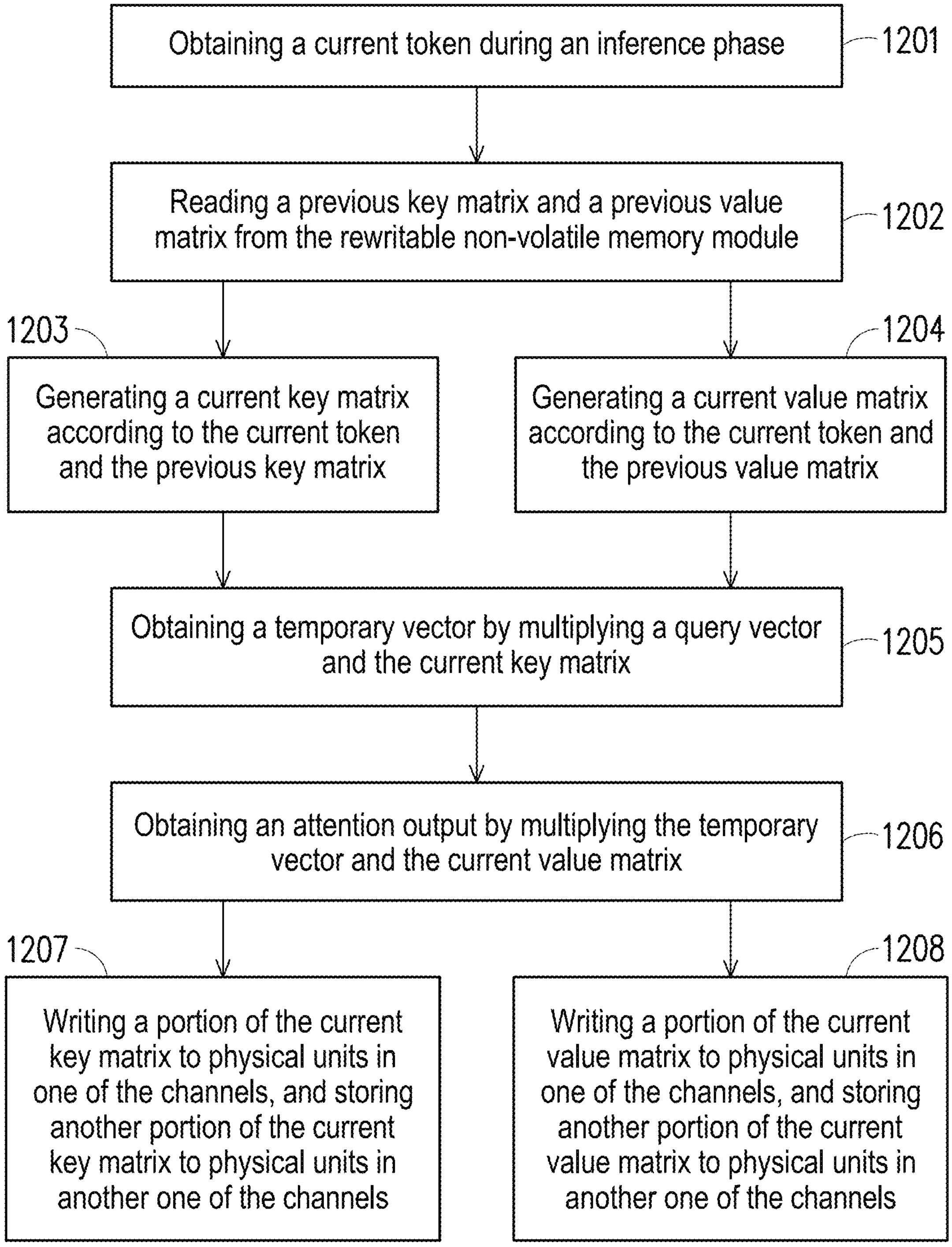
FIG. 12 is a flowchart of a data caching method according to an embodiment.

FIG. 12 is a flowchart of a data caching method according to an embodiment. Referring to FIG. 12, in step 1201, a current token is obtained during an inference stage. In step 1202, a previous key matrix and a previous value matrix are read from a rewritable non-volatile memory module. In step 1203, a current key matrix is generated according to the current token and the previous key matrix. For example, a query vector, a key vector and a value vector are first calculated according to the current token, and then the current key matrix may be generated by combining the key vector and the previous key matrix. In step 1204, a current value matrix is generated according to the current token and the previous value matrix. For example, the current value matrix may be generated by combining the value vector and the previous value matrix. In step 1205, the query vector is multiplied by the current key matrix to obtain a temporary vector.

In step 1206, the temporary vector is multiplied by the current value matrix to obtain the attention output. In step 1207, a portion of the current key matrix is written to the physical unit in one of the channels, and another portion of the current key matrix is stored in the physical unit in another channel. In step 1208, a portion of the current value matrix is written to the physical unit in one of the channels, and another portion of the current value matrix is stored in the physical unit in another channel. Each step in FIG. 12 has been described in detail as above, and are not repeated herein. It is worth noting that each step in FIG. 12 may be implemented as multiple program codes or circuits, and the disclosure is not limited thereto. In addition, the method of FIG. 12 may be used in conjunction with the above embodiments or may be used alone. In other words, other steps may be added between the steps of FIG. 12. In some embodiments, steps 1205 and 1206 may also be omitted. The disclosure does not limit the order of the steps in FIG. 12. For example, step 1203 and step 1204 may be performed simultaneously, or step 1205 and step 1206 may be performed after step 1207 and step 1208.

When executing KV caching, frequent data writing and reading operations are required. Through the aforementioned disclosed technology, the write and read speed may be improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A data caching method for a rewritable non-volatile memory module, wherein the rewritable non-volatile memory module comprises a plurality of channels, each of the channels comprises a plurality of physical units, and the data caching method comprises:

obtaining a current token during an inference phase;

reading at least one previous key matrix and at least one previous value matrix from the rewritable non-volatile memory module;

generating at least one current key matrix according to the current token and the at least one previous key matrix;

generating at least one current value matrix according to the current token and the at least one previous value matrix;

transmitting arrangement information of the at least one current key matrix and the at least one current value matrix to a memory control circuit unit, wherein the arrangement information is configured to calculate to which head, token, and feature in which data in each logic address belongs;

transmitting the data belonging to the head, the token, and the feature according to the arrangement information to the memory control circuit unit;

writing a portion of the at least one current key matrix to a first physical unit of the physical units in a first channel of the channels, and storing another portion of the at least one current key matrix to a second physical unit of the physical units in a second channel of the channels in parallel with writing the portion of the at least one current key matrix, wherein the first physical unit is different from the second physical unit, and the first channel is different from the second channel; and writing a portion of the at least one current value matrix to a third physical unit of the physical units in a third channel of the channels, and storing another portion of the at least one current value matrix to a fourth physical unit of the physical units in a fourth channel of the channels in parallel with writing the portion of the at least one current value matrix, wherein the third physical unit is different from the fourth physical unit, and the third channel is different from the fourth channel.

2. The data caching method according to claim 1, wherein the portion of the at least one current key matrix, the another portion of the at least one current key matrix, the portion of the at least one current value matrix, and the another portion of the at least one current value matrix are written into the corresponding physical units in a single level cell programming mode.

3. The data caching method according to claim 1, wherein the portion of the at least one current key matrix belongs to a first token, and the another portion of the at least one current key matrix belongs to a second token, the first token is different from the second token.

4. The data caching method according to claim 1, wherein the portion of the at least one current key matrix belongs to a first feature, and the another portion of the at least one current key matrix belongs to a second feature, the first feature is different from the second feature.

5. The data caching method according to claim 1, comprising:

calculating at least one query vector, at least one key vector, and at least one value vector according to the current token;

obtaining at least one temporary vector by multiplying the at least one query vector and the at least one current key matrix; and obtaining at least one attention output by multiplying the at least one temporary vector and the at least one current value matrix, wherein generating the at least one current key matrix according to the current token and the at least one previous key matrix comprises:

generating the at least one current key matrix by combining the at least one key vector and the at least one previous key matrix, wherein generating the at least one current value matrix according to the current token and the at least one previous value matrix comprises:

generating the at least one current value matrix by combining the at least one value vector and the at least one previous value matrix.

6. The data caching method according to claim 5, wherein the at least one query vector comprises a first query vector and a second query vector, the at least one key vector comprises a first key vector and a second key vector, the at least one value vector comprises a first value vector and a second value vector, the at least one previous key matrix comprises a first previous key matrix and a second previous key matrix, the at least one previous value matrix comprises a first previous value matrix and a second previous value matrix, wherein generating the at least one current key matrix by combining the at least one key vector and the at least one previous key matrix comprises:

generating a first current key matrix by combining the first key vector and the first previous key matrix, generating a second current key matrix by combining the second key vector and the second previous key matrix, wherein generating the at least one current value matrix by combining the at least one value vector and the at least one previous value matrix comprises:

generating a first current value matrix by combining the first value vector and the first previous value matrix, generating a second current value matrix by combining the second value vector and the second previous value matrix, wherein the portion of the at least one current key matrix belongs to the first current key matrix, the another portion of the at least one current key matrix belongs to the second current key matrix, wherein the portion of the at least one current value matrix belongs to the first current value matrix, the another portion of the at least one current value matrix belongs to the second current value matrix.

7. The data caching method according to claim 5, wherein calculating the at least one query vector, the at least one key vector, and the at least one value vector according to the current token comprises:

obtaining the at least one query vector by multiplying the current token by a query weight matrix obtaining the at least one key vector by multiplying the current token by a key weight matrix; and obtaining the at least one value vector by multiplying the current token by a value weight matrix.

8. The data caching method according to claim 1, wherein the current token is input to a first layer of a neural network, the neural network further comprises a second layer, the data caching method further comprises:

writing a portion of a current key matrix corresponding to the second layer and the portion of the current key matrix corresponding to the first layer into the physical units in a same one of the channels.

9. The data caching method according to claim 1, further comprising:

obtaining a next token;

reading the portion of the at least one current key matrix and the another portion of the at least one current key matrix from the channels in parallel; and reading the portion of the at least one current value matrix and the another portion of the at least one current value matrix from the channels in parallel.

10. A host system, comprising:

a memory storage device, comprising a rewritable non-volatile memory module, wherein the rewritable non-volatile memory module comprises a plurality of channels, each of the channels comprises a plurality of physical units; and a processor, electrically connected to the memory storage device and configured to execute a plurality of steps:

obtaining a current token during an inference phase;

reading at least one previous key matrix and at least one previous value matrix from the rewritable non-volatile memory module;

generating at least one current key matrix according to the current token and the at least one previous key matrix; and generating at least one current value matrix according to the current token and the at least one previous value matrix;

transmitting arrangement information of the at least one current key matrix and the at least one current value matrix to a memory control circuit unit of the memory storage device, wherein the arrangement information is configured to calculate to which head, token, and feature in which data in each logic address belongs;

transmitting the data belonging to the head, the token, and the feature according to the arrangement information to the memory control circuit unit;

wherein the memory storage device is configured to write a portion of the at least one current key matrix to a first physical unit of the physical units in a first channel of the channels, store another portion of the at least one current key matrix to a second physical unit of the physical units in a second channel of the channels in parallel with writing the portion of the at least one current key matrix, wherein the first physical unit is different from the second physical unit, and the first channel is different from the second channel, write a portion of the at least one current value matrix to a third physical unit of the physical units in a third channel of the channels, and store another portion of the at least one current value matrix to a fourth physical unit of the physical units in a fourth channel of the channels in parallel with writing the portion of the at least one current value matrix, wherein the third physical unit is different from the fourth physical unit, and the third channel is different from the fourth channel.

11. The host system according to claim 10, wherein the memory storage device is configured to write the portion of the at least one current key matrix, the another portion of the at least one current key matrix, the portion of the at least one current value matrix, and the another portion of the at least one current value matrix into the corresponding physical units in a single level cell programming mode.

12. The host system according to claim 10, wherein the portion of the at least one current key matrix belongs to a first token, and the another portion of the at least one current key matrix belongs to a second token, the first token is different from the second token.

13. The host system according to claim 10, wherein the portion of the at least one current key matrix belongs to a first feature, and the another portion of the at least one current key matrix belongs to a second feature, the first feature is different from the second feature.

14. The host system according to claim 10, wherein the steps further comprises:

calculating at least one query vector, at least one key vector, and at least one value vector according to the current token;

obtaining at least one temporary vector by multiplying the at least one query vector and the at least one current key matrix; and obtaining at least one attention output by multiplying the at least one temporary vector and the at least one current value matrix, wherein generating the at least one current key matrix according to the current token and the at least one previous key matrix comprises:

generating the at least one current key matrix by combining the at least one key vector and the at least one previous key matrix, wherein generating the at least one current value matrix according to the current token and the at least one previous value matrix comprises:

generating the at least one current value matrix by combining the at least one value vector and the at least one previous value matrix.

15. The host system according to claim 14, wherein the at least one query vector comprises a first query vector and a second query vector, the at least one key vector comprises a first key vector and a second key vector, the at least one value vector comprises a first value vector and a second value vector, the at least one previous key matrix comprises a first previous key matrix and a second previous key matrix, the at least one previous value matrix comprises a first previous value matrix and a second previous value matrix, wherein generating the at least one current key matrix by combining the at least one key vector and the at least one previous key matrix comprises:

generating a first current key matrix by combining the first key vector and the first previous key matrix, generating a second current key matrix by combining the second key vector and the second previous key matrix, wherein generating the at least one current value matrix by combining the at least one value vector and the at least one previous value matrix comprises:

generating a first current value matrix by combining the first value vector and the first previous value matrix, generating a second current value matrix by combining the second value vector and the second previous value matrix, wherein the portion of the at least one current key matrix belongs to the first current key matrix, the another portion of the at least one current key matrix belongs to the second current key matrix, wherein the portion of the at least one current value matrix belongs to the first current value matrix, the another portion of the at least one current value matrix belongs to the second current value matrix.

16. The host system according to claim 14, wherein calculating the at least one query vector, the at least one key vector, and the at least one value vector according to the current token comprises:

obtaining the at least one query vector by multiplying the current token by a query weight matrix obtaining the at least one key vector by multiplying the current token by a key weight matrix; and obtaining the at least one value vector by multiplying the current token by a value weight matrix.

17. The host system according to claim 10, wherein the current token is input to a first layer of a neural network, the neural network further comprises a second layer, wherein the memory storage device is configured to write a portion of a current key matrix corresponding to the second layer and the portion of the current key matrix corresponding to the first layer into the physical units in a same one of the channels.

18. The host system according to claim 10, wherein the host system is further configured to obtain a next token, wherein the memory storage device is configured to read the portion of the at least one current key matrix and the another portion of the at least one current key matrix from the channels in parallel, and read the portion of the at least one current value matrix and the another portion of the at least one current value matrix from the channels in parallel.

* * * * *